United States Patent [19]
Aldag

[11] 3,953,328
[45] Apr. 27, 1976

[54] SEPARATION OF SLUDGE

[76] Inventor: Wilhelm Aldag, 42 Ubierstrasse, D-532 Bad Godesberg-Bonn, Germany

[22] Filed: Sept. 4, 1974

[21] Appl. No.: 503,188

Related U.S. Application Data

[63] Continuation of Ser. No. 276,033, July 28, 1972, abandoned.

[30] Foreign Application Priority Data

Sept. 7, 1971   Germany............................ 2144605

[52] U.S. Cl. ..................................... 210/7; 210/13; 210/20; 210/97; 210/197
[51] Int. Cl.² .......................................... C02C 1/08
[58] Field of Search .................................... 210/4–8, 210/13, 14, 20, 194–197, 97

[56] References Cited
UNITED STATES PATENTS

| | | |
|---|---|---|
| 3,053,390 | 9/1962 | Wood .................................. 210/195 |
| 3,216,573 | 9/1965 | Irion .............................. 210/532 X |
| 3,385,444 | 5/1968 | Dufournet.......................... 210/7 X |
| 3,537,583 | 11/1970 | Wahner et al. ..................... 210/4 X |
| 3,607,737 | 9/1971 | Gamer ............................. 210/14 X |
| 3,709,363 | 1/1973 | Smart et al. ..................... 210/197 X |
| 3,770,624 | 11/1973 | McKibben et al. ................ 210/14 X |
| 3,805,957 | 4/1974 | Oldham et al. .................. 210/195 X |

*Primary Examiner*—Thomas G. Wyse
*Attorney, Agent, or Firm*—Strauch, Nolan, Neale, Nies & Kurz

[57] ABSTRACT

A method for the separation of sludge in which a rising stream of liquid bearing suspended material is established in a clarifying trough and concentrated suspended material is drawn off by suction at that zone in the trough where the tendency of the material to sink owing to gravity is substantially the same as its tendency to be carried upwards in the stream, part of the drawn off material being fed back to an aeration chamber.

12 Claims, 2 Drawing Figures

SEPARATION OF SLUDGE

CROSS-REFERENCE TO RELATED APPLICATION

This application is a continuation of application Ser. No. 276,033, filed July 28, 1972, now abandoned.

BACKGROUND OF THE INVENTION

The invention relates to a method and an apparatus for the separation of sludge and suspended material from sewage water or other liquid to be purified. More particularly, the invention relates to a biological clarifying apparatus for the treatment of sewage, in which instead of the customary sedimentation of suspended material and the removal thereof in a thickened condition from the bottom of a clarifying chamber, a separation of the suspended material from the purified liquid is effected in a rising stream of the liquid to be purified, the separation being based on the different flow speeds of water and sludge in accordance with the different specific weight of water and sludge preferably aided by a funnel or gutter-like shaping of at least part of the clarifying trough.

In fully biological plants for the clarification of sewage, the sewage is fed to an aeration chamber by free fall or by means of a raw water pumping arrangement, after passing a sand trap and possibly after being preliminarily cleaned mechanically.

In the aeration chamber, aeration takes place with any desired aeration devices, such as surface aerating devices, deep lying aeration devices and so on. Microbes present in the aeration chamber feed on the organic impurities of the sewage and consequently purify it.

In the subsequent clarifying arrangement, the microbes, so-called active slurry, are separated from the water and are completely or partly fed back to the aeration chamber in order that the active slurry concentration is maintained. Purified water which is free of the active slurry can be obtained after return of the active slurry to the aeration chamber.

The separation of the mixture of slurry and water preferably takes place in so-called clarification troughs. Such clarification troughs may have various forms but they all operate in a similar manner, in that the active slurry forms a sediment as a result of its somewhat higher specific weight than the water, and is drawn off in a more of less thickened condition at the bottom of the clarifying trough, and is completely or partly returned to the aeration chamber. Moreover, all of the known arrangements have in common the fact that the separation of active slurry and water takes place in different directions, i.e. the clarified water generally flows upwardly in the case of circular troughs or towards the side in the case of longitudinal troughs, while the active slurry moves downwardly. Separation systems of the kind above described have been known since the beginning of sewage purification technology and although they have become well established they have a number of disadvantages. For example, heavy or bulky material passing into the clarifying trough, more particularly when there is no preliminary mechanical cleaning, collects on the bottom of the clarifying trough, since its sinking speed is greater than that of the active slurry, and can cause blockages there or impair or prevent the necessary feeding back of the active slurry. This causes a reduction in the efficiency of the clarifying trough or even a complete interruption of its effective operation.

A considerable disadvantage is that with many after-clarifying arrangements a large portion of the active slurry remains to long in the unaerated clarifying trough since as a result of its specific weight and the considerable upward current in the lower part of the clarifying trough, it does not come into the range of the means by which it is drawn off. This leads to decay and expanding of the active slurry, and is particularly liable to occur with clarifying troughs of installations of medium and of small size, especially if they are operated with a high volume of slurry.

SUMMARY OF THE INVENTION

The invention consists in a method for the separation of sludge, suspended material and the like from liquid sewage or other liquid to be purified, wherein the liquid is caused to flow through an aeration chamber into a clarifying trough, a rising stream of liquid is established in the clarifying trough in such a manner as to have a speed of flow which decreases as the liquid rises, and suspended microbiological and other material in the rising stream is permitted to undergo concentration in that zone of the clarifying trough in which the tendency of the said material to sink owing to gravity is substantially the same as its tendency to be carried upwards in the stream the concentrated material being drawn off at the said zone by suction means and at least in part fed back to the aeration chamber, the liquid of the rising stream being carried off from the clarifying trough through an outlet at a level above the said zone.

The invention also consists in an apparatus for use in performing the above defined method, comprising an aeration chamber provided with means for aerating liquid therein, a clarifying trough in communication with the aeration chamber for receiving the liquid therefrom in a rising stream and so shaped that the speed of flow of said stream decreases as the stream rises, an outlet for clarified liquid disposed at an upper level of the clarifying trough, and one or more pumps with suction pipes arranged with their inlets in the clarifying trough at a level below the said outlet level, the level of the said inlets being such that suspended microbiological and other material in the rising stream, which material concentrates at a zone where its tendency to sink owing to gravity is substantially the same as its tendency to be carried upwards in the stream, is drawn off from the clarifying trough by the pumps, for at least partial return into the aeration chamber.

BRIEF DESCRIPTION OF THE DRAWINGS

There follows a detailed description of the preferred embodiment to be read together with the accompanying drawings which are provided solely for the purposes of illustration.

DETAILED DESCRIPTION OF THE PREFERRED EMBODIMENTS

Figure 1:
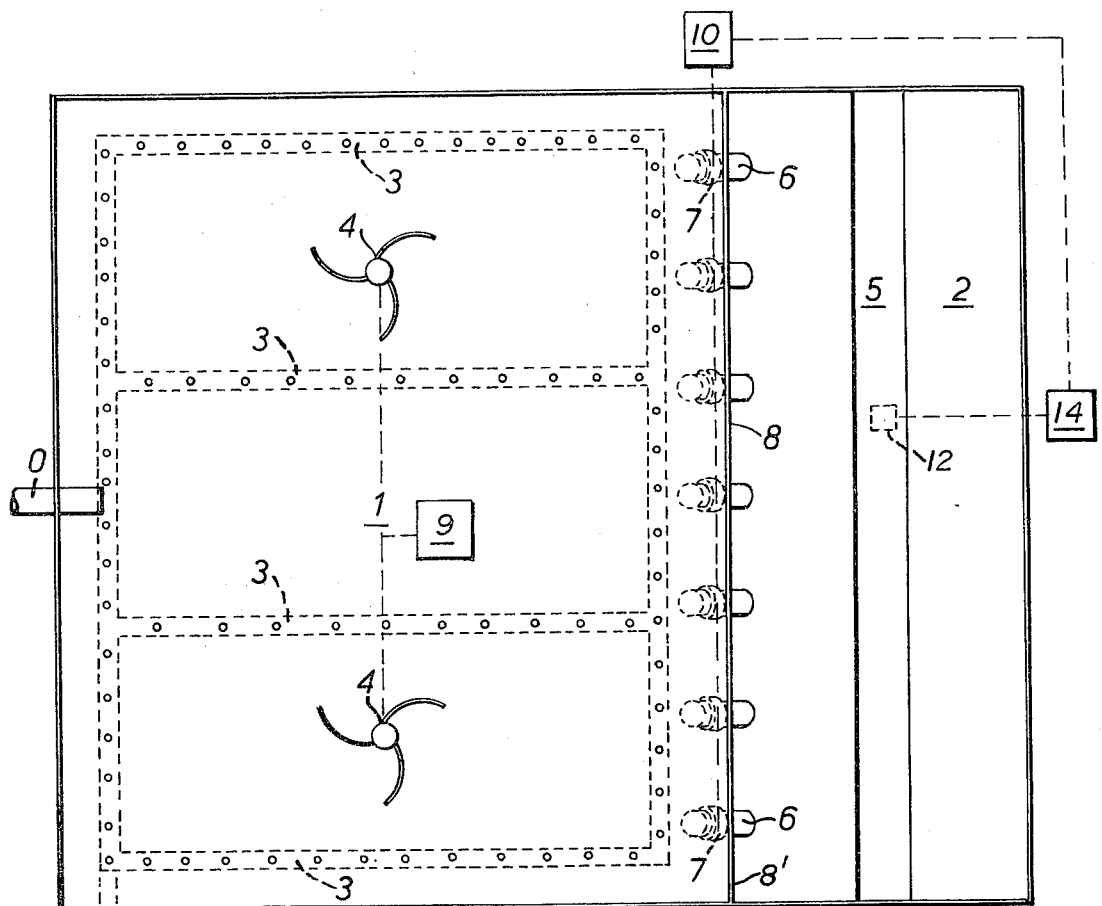
FIG. 1 is a plan view of a sewage treatment apparatus of the invention.
Figure 2:
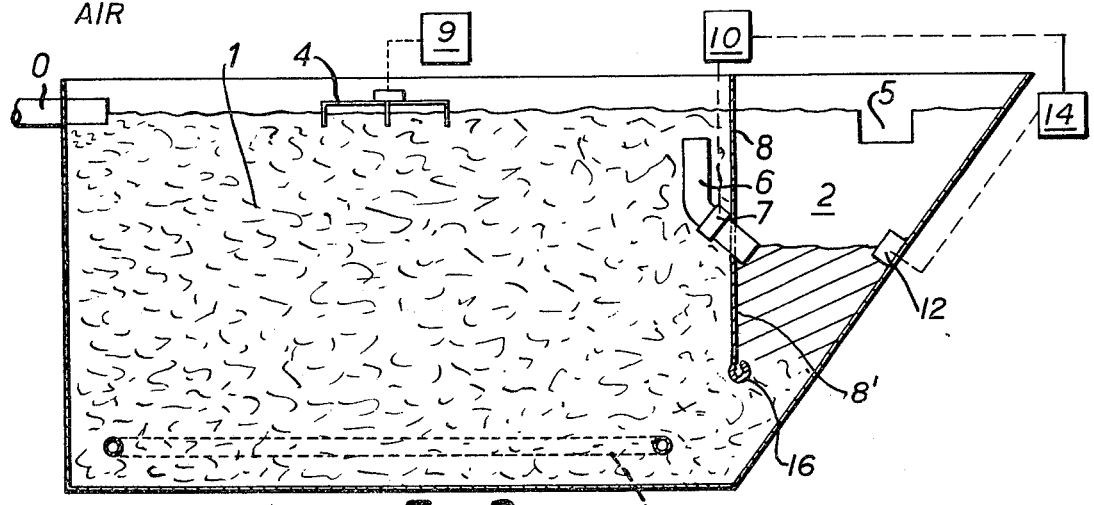
FIG. 2 is a sectional side view of the apparatus.

The apparatus comprises a common chamber which is divided by a separating wall 8 into an aeration chamber 1 and a clarifying trough 2. An inlet 0 for sewage to be treated is provided, which supplies the sewage to the aeration chamber 1. The chamber 1 has aeration means, two different means being provided, namely surface aerating devices 4 in the form of rotating paddles, and submerged pipes 3 through which air can be bubbled into the liquid in the chamber 1. The rotating paddle devices 4 can be rotated by any suitable conventional means 9 such as conventional and per se well-known electric motors.

The separating wall 8 does not extend to the bottom of the common chamber and there is thus communication between the aeration chamber 1 and the clarifying trough 2 at a low level.

The outer wall of the clarifying chamber 2 is inclined so that the clarifying trough widens upwardly in a funnel-like or trough-like manner.

The further the mixture of active slurry and water rises in the clarifying trough 2, the slower the speed of rising becomes, owing to the funnel-like widening of the clarifying trough.

As a result of the higher specific weight of the active slurry relative to the water, at a certain speed of flow of the water the active slurry no longer flows with the water but remains in a suspended condition and forms a concentrated zone of active slurry. This is formed with a speed of rising of the water in the clarifying trough of 0.5 to 1.5 meters per hour.

One or more suction pipes 6 through which the active slurry is drawn by means of pumps 7 for at least partial return to the aeration chamber 1, are provided at the level of the concentrated zone of active slurry. The suction pipes are mounted so as to be displaceable in a more or less vertical direction by any suitable mechanism 10 as schematically illustrated by block 10 which per se are conventional and well-known, so as to enable the suction action to be exerted at the desired level within the clarifying trough 2.

Material which is heavier than the active slurry can not pass into the suction pipes 6 and cause blockages. Furthermore, different times of residence of the active slurry in the clarifying trough 2 are prevented, since the entirety of the active slurry is carried upwardly with the water and is only separated from the water at the region where the speed of flow of the water is no longer sufficient to draw the active slurry upwardly further. The suction pipes 6 are disposed at this level.

With an angular construction of the apparatus, the separating wall 8 which separates the clarifying chamber 2 from the aeration chamber 1, can be so arranged that a conceptual downward extension of the separating wall intersects the side wall of the aeration chamber 1 but not the bottom plate thereof, in order to reduce the possibility of collection of bulky material in the region of narrow transition to the clarifying trough 2. In any case, an inclined arrangement resulting in a funnel-like shape is required.

For reducing adhesion of material on the separating wall 8, and the consequent turbulence produced by such adhered material, the separating wall 8 is provided with a suitable plastics coating 8'. Alternatively, it may consist of a sheet, such as a synthetic plastic sheet, which experiences a light vibration caused by the aeration and flow of the liquid, so that adhesion of slurry particles is reduced. Specific plastic materials with low coefficient of surface friction and suitable for sewage and waste treatment installations are per se well-known and can be identified in engineering handbooks on plastics.

The above described apparatus, and the method inherent in its use, are suitable for the treatment of sewage and for the clarification and purification of other liquids which contain suspended material having a higher specific weight than the liquid itself.

Modifications are possible. For example, any desired number of suction pipes may be provided for withdrawing the active slurry from the clarifying chamber 2. The suction pipes may be connected together in such a manner that they are all adjustable to the desired level simultaneously.

Instead of providing plastics coatings on the inner walls of the clarifying chamber, means, such as an air pipe 16 which is similar to the air pipes 3 in the aeration chamber, may be provided for establishing a screening layer of air or gas over at least part of these walls so as to reduce adhesion of the material being treated.

Since the level of the inlet openings of the suction pipes should be adjusted to the level of the concentrated zone of active slurry in the clarifying chamber 2, and since the position of this zone depends on the speed of flow of the liquid in the clarifying trough, control means may be provided for detecting the speed of flow of the liquid and adjusting the suction pipes so that their inlets are disposed at the optimum level. Flow detecting and condition responsive control means for controlling mechanisms are per se well-known to those skilled in the art and are schematically illustrated by block diagrams of a detecting means 12 with a control device 14 responsive to the detecting means for controlling the suction pipe adjusting mechanism 10.

I claim:

1. A method for the separation of sludge, suspended material and the like from liquid to be purified, comprising the steps of causing the liquid to flow through an aeration chamber into a clarifying chamber; establishing a rising stream of liquid in the clarifying chamber in such a manner as to have a speed of flow which decreases as the liquid rises; permitting suspended microbiological and other material in the rising stream to undergo concentration in an intermediate zone of the clarifying chamber in which the tendency of the said material to sink owing to gravity is substantially the same as its tendency to be carried upwards in the stream; drawing off the concentrated material at the said intermediate zone by suction means and at least in part feeding it back to and introducing it to the upper zone of the aeration chamber; varying the disposition of the suction means to the level where the intermediate zone of concentration occurs; and carrying off the liquid of the rising stream from the clarifying chamber through an outlet at a level above the said zone.

2. A method as defined in claim 1 wherein the flow of liquid from the aeration chamber is from the lower portion of the aeration chamber into the bottom of the clarification chamber and the said zone where drawing off of the concentrated material occurs is above the entry from the aeration chamber to the clarification chamber.

3. An apparatus for use in separation of sludge, suspended material and the like from liquid to be purified, comprising: an aeration chamber provided with means for aerating liquid therein; a clarifying chamber in fluid communication with the aeration chamber for receiving the liquid therefrom in a rising stream and said clarifying chamber being so shaped that the speed of flow of said stream decreases as the liquid rises; an outlet for clarified liquid disposed at an upper level of the clarifying chamber; at least one pump with an outlet disposed in the aeration chamber and with a suction pipe arranged with its inlet in the clarifying chamber at an intermediate level below the said outlet level and above the fluid communication between the two chamber, the level of the said suction pipe inlet being such that suspended microbiological and other material in the rising stream, which material concentrates at an intermediate zone where its tendency to sink owing to gravity is substantially the same as its tendency to be carried upwards in the stream, is drawn off from the clarifying chamber by the pump for at least partial return into an upper level of the aeration chamber; and means connected to said suction pipe providing that it may be displaceable to a desired intermediate level whereat said intermediate zone of concentrated material occurs.

4. An apparatus as defined in claim 3, wherein a plurality of pumps and suction pipes are provided.

5. An apparatus as defined in claim 4, wherein the suction pipes are connected together in such a manner that they are all adjustable to the desired level simultaneously.

6. An apparatus as defined in claim 3, wherein the clarifying chamber is of upwardly widening shape, whereby to establish said decreasing speed of flow.

7. An apparatus as defined in claim 6, wherein the aeration chamber and the clarifying chamber are formed by partial subdivision of a larger common chamber by means of a vertical or inclined separating wall which does not extend as far as the bottom of the said common chamber, and wherein the suction pipes are carried by the separating wall in such a manner that their level in the clarifying chamber is adjustable.

8. An apparatus as defined in claim 6, wherein the separating wall is in the form of a synthetic plastics sheet which is continuously cleaned as a result of the vibration which it experiences, caused by the aeration and flow of the liquid in the aeration chamber.

9. An apparatus as defined in claim 6, wherein the separating wall of the clarifying chamber is so arranged that a conceptual extension of it does not intersect the bottom of the aeration chamber, but intersects a side wall of the aeration chamber.

10. An apparatus as defined in claim 3, wherein the inner walls of the clarifying chamber, over at least part thereof, are provided with coatings of a material which resists adhesion of the suspended material being treated, whereby to avoid the turbulence caused by such adhered material.

11. An apparatus as defined in claim 3, and comprising means for establishing a screening layer of gas over at least part of the inner walls of the clarifying chamber, whereby to reduce adhesion of the material being treated and thus avoid the turbulence caused by such adhered material.

12. An apparatus as defined in claim 3, wherein control means are provided for detecting the speed of flow of the liquid in the clarifying chamber and adjusting said suction pipes so that their inlets are disposed at the optimum level, the said level being related to the speed of flow of the liquid.

* * * * *